US012581259B2

(12) United States Patent
Schörkhuber

(10) Patent No.: US 12,581,259 B2
(45) Date of Patent: Mar. 17, 2026

(54) METHOD FOR GENERATING A CONVERSION FILTER FOR CONVERTING A MULTIDIMENSIONAL OUTPUT AUDIO SIGNAL INTO A TWO-DIMENSIONAL AUDIO SIGNAL FOR LISTENING

(71) Applicant: atmoky GmbH, Graz (AT)

(72) Inventor: Christian Schörkhuber, Graz (AT)

(73) Assignee: atmoky GmbH, Graz (AT)

( * ) Notice: Subject to any disclaimer, the term of this patent is extended or adjusted under 35 U.S.C. 154(b) by 220 days.

(21) Appl. No.: 18/039,517

(22) PCT Filed: Nov. 3, 2021

(86) PCT No.: PCT/AT2021/060401
§ 371 (c)(1),
(2) Date: May 31, 2023

(87) PCT Pub. No.: WO2022/115888
PCT Pub. Date: Jun. 9, 2022

(65) Prior Publication Data
US 2023/0413000 A1 Dec. 21, 2023

(30) Foreign Application Priority Data
Dec. 1, 2020 (AT) .................................. A 261/2020

(51) Int. Cl.
*H04S 3/00* (2006.01)

(52) U.S. Cl.
CPC .......... *H04S 3/006* (2013.01); *H04S 2400/01* (2013.01); *H04S 2400/07* (2013.01); *H04S 2400/09* (2013.01)

(58) Field of Classification Search
CPC .. H04S 3/006; H04S 2400/01; H04S 2400/07; H04S 2400/09
See application file for complete search history.

(56) References Cited

U.S. PATENT DOCUMENTS 10,582,329 B2 * 3/2020 Magariyachi ........... H04S 7/304
11,252,524 B2 * 2/2022 Magariyachi .......... H04R 5/033
(Continued)

OTHER PUBLICATIONS

Internationaler Recherchenbericht und Schriftlicher Bescheid [International Search Report and the Written Opinion] Dated Feb. 3, 2022 From the International Searching Authority Re. Application No. PCT/AT2021/060401 and Its Translation of Search Report Into English. (15 Pages).
(Continued)

*Primary Examiner* — David L Ton

(57) ABSTRACT

The present invention relates to methods for generating a conversion filter (KF) for converting a multidimensional original audio signal (AA) into a two-dimensional listening audio signal (HA), comprising the following steps:

1. Transformation of a time-based original audio signal (PAA) into a frequency-based original audio signal (FAA)
2. Sequential optimization of a basis conversion matrix (BKM) for converting the frequency-based original audio signal (FAA) into a frequency-based listening audio signal (FHA) using a first optimization algorithm (KA1), preferably starting from low frequencies and ascending at least up to a switching frequency (UF)
3. Sequential optimization of the basis conversion matrix (BKM) for converting the frequency-based original audio signal (FAA) into a frequency-based listening audio signal (FHA) using a second optimization algorithm (KA2), preferably starting from the switching frequency (UF) and ascending to high frequencies 4. Storing the optimized basis conversion matrix (BKM) of the correlation between the frequency-based original audio signal (FAA) and the frequency-based listening audio signal (FHA) in a frequency-based conversion matrix (FKM) 5. Transforming the frequency-based (Continued)

conversion matrix (FKM) into a time-based conversion matrix (PKM) as a conversion filter (KF).

15 Claims, 9 Drawing Sheets

(56) References Cited

U.S. PATENT DOCUMENTS

| | | | | |
|---|---|---|---|---|
| 11,589,181 | B1 * | 2/2023 | Schaefer | H04S 7/303 |
| 2010/0329466 | A1 * | 12/2010 | Berge | H04R 3/12<br>381/22 |
| 2018/0324542 | A1 * | 11/2018 | Seo | H04R 5/02 |

OTHER PUBLICATIONS

Schörkhuber et al. "Binaural Rendering of Ambisonic Signals Via Magnitude Least Squares", DAGA 2018, 44. Jahrestagung für Akustik, XP055882871, München, Germany, Mar. 19-22, 2018, p. 339-342, Mar. 19, 2018.

Schörkhuber et al. "Linearly and Quadratically Constrained Least-Squares Decoder for Signal-Dependent Binaural Rendering of Ambisonic Signals", 2019 Audio Engineering Society, AES International Conference on Immerse and Interactive Audio, XP040706633, York, UK, Mar. 27-29, 2019, Conference Paper 22, p. 1-9, Mar. 27, 2019.

* cited by examiner

METHOD FOR GENERATING A CONVERSION FILTER FOR CONVERTING A MULTIDIMENSIONAL OUTPUT AUDIO SIGNAL INTO A TWO-DIMENSIONAL AUDIO SIGNAL FOR LISTENING

RELATED APPLICATIONS

This application is a National Phase of PCT Patent Application No. PCT/AT2021/060401 having International filing date of Nov. 3, 2021, which claims the benefit of priority of Austria Patent Application No. A 261/2020 filed on Dec. 1, 2020. The contents of the above applications are all incorporated by reference as if fully set forth herein in their entirety.

FIELD AND BACKGROUND OF THE INVENTION

The present invention relates to a method for generating a conversion filter for converting a multidimensional original audio signal into a two-dimensional listening audio signal, a computer program product comprising instructions for executing such a method, as well as a conversion method which uses a conversion filter generated by a method according to the invention.

It is known that two-dimensional listening audio signals can be generated from multidimensional original audio signals. For example, it is known to use multidimensional microphone arrays to produce multidimensional audio recordings. For instance, microphone arrays can be equipped with a variety of microphones, which then combine from different recording directions to an audio source, such as a music concert, a multitude of individual dimensions into a multidimensional original audio signal. In contrast to known playback solutions, such as with a correspondingly multidimensional playback option, playback options on headphones are limited to two playback positions. Headphones are worn in or on the respective ear and are limited to outputting a one-dimensional audio signal on the left and right sides.

Known solutions are designed to generate two-dimensional listening audio signals from multidimensional original audio signals, which, however, when played back, should create a spatial or three-dimensional auditory effect, despite the two-dimensional output. This spatial or multidimensional auditory effect should closely approximate a real listening experience. Ideally, the listener of the two-dimensional listening audio signals should feel as if they are in the concert hall where the corresponding recording of the multidimensional original audio signal was made.

To achieve this, known solutions use the conversion of multidimensional original audio signals into two-dimensional listening audio signals. This conversion is usually carried out using conversion filters. To obtain these conversion filters, a conversion algorithm is typically used, which is capable of generating a multitude of two-dimensional target listening audio signals from a variety of multidimensional original audio signals with high computational effort. The correlation resulting from this conversion using the conversion algorithm is then stored as a conversion filter and used in the future conversion of any original audio signal into the corresponding listening audio signal. In the conversion process, the conversion filter can be used in a computationally efficient way. Further use of the conversion algorithm is no longer necessary.

One of the drawbacks of the known solutions is that the conversion algorithms used to transform the original audio signal into the listening audio signal have varying quality levels across the entire frequency range. In particular, the known conversion algorithms perform well for low frequencies, but exhibit relatively large errors at high frequencies. This results in an inconsistent quality of the conversion, depending on the frequency range in the original audio signal.

The task of the present invention is to at least partially remedy the disadvantages described above. In particular, the task of the present invention is to improve the listening experience of multidimensional original audio signals in a cost-effective and simple manner.

SUMMARY OF THE INVENTION

The aforementioned object is achieved by a method with the features of claim 1, a computer program product with the features of claim 14, as well as a conversion method with the features of claim 15. Further features and details of the invention are apparent from the subclaims, the description and the drawings. Features and details described in connection with the inventive method are, of course, also applicable in connection with the inventive computer program product and the inventive conversion method, and vice versa, so that reference can always be made to each of the invention aspects in relation to the disclosure of the individual invention aspects.

According to the invention, a method is provided for generating a conversion filter for converting a multidimensional original audio signal into a two-dimensional listening audio signal. Such a method comprises the following steps:

- Transformation of a time-based original audio signal into a frequency-based original audio signal;
- Sequential optimization of a basis conversion matrix of the frequency-based original audio signal into a frequency-based listening audio signal using a first optimization algorithm, preferably starting from low frequencies and ascending at least up to a switch frequency;
- Sequential optimization of the basis conversion matrix of the frequency-based original audio signal into a frequency-based listening audio signal using a second optimization algorithm, preferably starting from the switch frequency and ascending to high frequencies;
- Storing the optimized basis conversion matrix of the correlation between the frequency-based original audio signal and the frequency-based listening audio signal in a frequency-based conversion matrix;
- Re-transforming the frequency-based conversion matrix into a time-based conversion matrix as a conversion filter.

The method of the present invention is based on the concept of converting an original audio signal into a listening audio signal, and storing the relationship between the conversion result and the output data as an optimized conversion matrix. This conversion filter will be used for future conversions of multidimensional original audio signals into two-dimensional listening audio signals, particularly with reference to the conversion method described below. Here, multidimensional signals refer to multi-channel signals, and two-dimensional signals refer to two-channel signals.

The invention is applicable to both virtual and real audio signals, which form the starting point for the inventive method. These can be referred to as input matrices, spatial transfer functions, or position-dependent transfer functions, and their multidimensionality also includes the position of a virtual or real audio source. For example, such an original audio signal can have 70 channels, corresponding to a microphone array with 70 microphones. In addition, for example, 1000 different directions for the individual channels are contained in this original audio signal, i.e., 70 channels for each direction. In total, in this example, the input audio signal includes a combination of 70 times 1000 and thus 70,000 individual channels, which not only take into account the temporal profile of the signal but also its different possible orientations to the microphone array.

It is important to note that real audio signals are not necessarily required for the inventive method. Instead, virtual or artificially generated signals are also possible, which include the correlation of the respective position to the microphone array. Within the scope of the present invention, an original audio signal is therefore to be understood as any form of corresponding measurement signal. The inventive method optimizes a basic relationship in the form of an existing basic conversion matrix in a frequency-dependent manner. Depending on the conversion algorithm used, an empty basic conversion matrix can also be used. The result of the method combines this multitude of original audio signals into a single optimized multidimensional conversion matrix, thereby storing the relationship between the original audio signal, including its position dependency, and the listening audio signal, including its position dependency, as a conversion matrix result.

In the present invention, the conversion takes place in a transformation space. For this purpose, a time-based original audio signal, i.e., all individual dimensions of this multidimensional original audio signal containing all directions, is transformed into individual frequency-based channels of the original audio signal. For example, a fast Fourier transform can be used. This frequency-based original audio signal, i.e., all individual signals of the multidimensional original audio signal, is then converted from low frequencies to high frequencies into a frequency-based listening audio signal. This means that using a basis conversion matrix, a conversion is performed from the multidimensional design of the original audio signal to a two-dimensional design of the listening audio signal by mathematical operations within the scope of the present invention. This conversion is carried out for all recorded directions in the present invention. In the example described above with 1000 directions, the conversion leads to 1000 two-channel results, so that the listening audio signal in the conversion result contains a total of 2000 individual channels in this example.

To optimize the basis conversion matrix, the conversion result is compared, for example, with a predetermined listening audio signal that belongs to the used original audio signal. The conversion result is compared as the actual value with the predetermined audio signal as the target value and/or with respect to an error measure. The difference between these values is optimized and reduced by the two optimization algorithms, either by single optimization and/or by iterative optimization. As a result of the optimization with the optimization algorithms, the basis conversion matrix is changed in a targeted manner until the error between actual and target value is reduced. The thus optimized basis conversion matrix is finally stored as a frequency-based conversion matrix.

The inventive core idea is now ensured by not using a single optimization algorithm as in known solutions, but by dividing it into at least two different optimization algorithms. The first optimization algorithm differs in its algorithmic implementation from the second optimization algorithm. In other words, the first optimization algorithm is based on different mathematical principles than the second optimization algorithm. For example, it is conceivable that a phase reference is canceled out by taking the mathematical magnitude in the second optimization algorithm. However, it is also possible that other differences exist between the optimization algorithms.

According to the invention, the conversion now preferably starts at low frequencies. It is preferred to start at the lowest audible frequency and optimize using the first optimization algorithm. In order to obtain the conversion filters from the frequency-based conversion matrices by an inverse Fourier transformation, optimization is also carried out for frequencies below and above the audible range. Preferably, optimization begins at 0 Hz and is carried out up to the highest frequency contained in the signal. This depends on the sampling rate of the signals and could be far above the audible range. This first optimization algorithm will now optimize the basis conversion matrix along the frequencies in ascending order, at least until a switch frequency is reached. This switch frequency can be a fixed switch frequency, as will be explained later. However, variable switch frequencies are also conceivable, which are defined by additional influencing parameters, especially during the course of a method according to the invention. In the direction of high frequencies, the second optimization algorithm is now used from at least the switch frequency to carry out the optimization for the conversion into the frequency-based listening audio signal. Thus, two different optimization algorithms can be combined in a single optimization task.

The sequential optimization from low to high frequencies allows for different quality requirements and specifications of each optimization algorithm to be taken into account. For example, the first optimization algorithm may advantageously exhibit a high optimization quality, such as in the form of perceptual quality, for low frequencies, while the second optimization algorithm may preferably exhibit good optimization quality for high frequencies. This means that it is irrelevant whether the first optimization algorithm exhibits good optimization quality at high frequencies and/or the second optimization algorithm exhibits good optimization quality at low frequencies, since the optimization result of the optimization algorithm that works with high optimization quality in the respective frequency range can be used. Of course, the use of three or even more optimization algorithms within the scope of the present invention is also conceivable. The inverse transformation is now performed for all optimized conversion matrices, especially when different optimized conversion matrices have been generated for different frequencies.

Compared to known solutions, it is thus possible to apply different quality criteria and different optimization quality for different conversion frequencies, so that the quality over the entire frequency range to be converted can be increased compared to known solutions with a single optimization algorithm. Particularly with high conversion frequencies, an improved quality can be expected, so that the stored correlation in the frequency-based conversion matrix is of higher conversion quality. This leads to the fact that after the transformation back into a time-based conversion matrix, the corresponding conversion quality is also increased for the resulting conversion filter. In other words, the conversion matrix generated by the inventive method is used directly or indirectly as a conversion filter. The relationships between the different source directions and their manifestation or effect in a two-dimensional audio signal determined by the method are thus stored in the conversion filter by the optimization, so that its application to a conversion task allows for a particularly realistic listening experience and/or improved sound quality.

If the optimization algorithms are used at least partially in parallel, as will be explained in more detail later, such parallel results can also influence the conversion matrix together. This is done particularly taking into account the maximum permissible conversion errors, so that the quality of the conversion matrix can be further improved.

Hence, the present invention provides a method that allows for an increased conversion quality compared to known solutions by using at least two different optimization algorithms with increased computational effort. This increased conversion quality is reflected in the conversion matrix and the resulting conversion filter, so that the subsequent low-computational application of the conversion filter in a conversion process leads to an improved conversion quality and thus an enhanced listening experience for two-dimensional listening audio signals.

In practice, this means that any number of multidimensional original audio signals, such as different songs, concerts, film sound, or game sound, can be converted into the two-dimensional listening audio signal for the respective user through the computationally efficient conversion filter, resulting in an improved listening experience, particularly a more realistic three-dimensional listening experience.

It should be noted that a method according to the invention is specific to the respective microphone arrangement, i.e., the source of the multidimensional original audio signal used. For each source, a specific implementation of a method according to the invention is preferably carried out. Furthermore, a conversion filter produced in this way is specific to a conversion target, which is also referred to as a head-related transfer function (HRTF). This HRTF information can be used specifically for a defined group of listeners. Of course, it is also possible to design a profile for a specific listener and to use the HRTF as an individual profile and thus as a person-specific profile to provide a personally specified conversion filter for this person, his or her listening habits, and his or her auditory geometry.

Based on the preceding explanation, it is now apparent that it becomes possible in a simple and cost-effective way to significantly increase the quality of the multidimensional listening experience with a two-dimensional listening audio signal.

It is advantageous for an inventive method to use a predefined fixed switching frequency as a switching frequency. For example, it can be assumed that in different frequency ranges, the different optimization algorithms bring a defined and different optimization quality with them. With this knowledge, it is now possible to distinguish the individual areas with high optimization quality from the areas with low optimization quality and to define the limits with the fixed and predefined switching frequency. Thus, in an inventive method, optimization takes place in a certain frequency range with the optimization algorithm that brings the best optimization quality for this section, up to and/or starting from the corresponding switching frequency. This fixed specification makes it possible to avoid parallel optimizations almost completely, so that despite the high computational effort and despite the use of different optimization algorithms, the computational effort for carrying out an inventive method can be minimized.

It is also advantageous if, in a method according to the invention, at least in sections, in particular completely from the low frequencies up to the switching frequency, the first optimization algorithm and the second optimization algorithm are carried out in parallel, wherein the difference between the two optimization results is determined as the optimization error, in particular with regard to the same error measure, of the first optimization algorithm. This allows the parallel conversion to represent a quality check of the first optimization algorithm by the second optimization algorithm, which is assumed to work qualitatively better. Within the scope of the present invention, a better optimization is also understood to mean an optimization of a different error measure. Thus, in the sense of the present invention, an optimization algorithm can be understood as a combination of a mathematical relationship and an error measure. The two optimization algorithms differ in at least one of these two components, so that the same mathematical relationship can be used for a different error measure and/or for an identical error measure, resulting in the second optimization algorithm being carried out until a frequency is reached at which the second optimization algorithm becomes decisive as the leading optimization result because the first optimization algorithm brings inadequate optimization quality due to the increasing optimization error. In this way, a flexible and variable switching frequency is defined from the point at which a maximum permissible optimization error is reached, which allows specific switching frequencies to be set automatically for different optimization tasks.

In an embodiment according to the preceding paragraph, it is advantageous to store the result of the first optimization algorithm with a variable switching frequency in the frequency-based conversion matrix until a predefined error limit is reached. From this variable switching frequency onwards, the result of the second optimization algorithm is stored. This flexible switching through a variably adapted switching frequency leads to a further improvement in the optimization result according to the invention, particularly the quality of the resulting conversion filter.

It can also be advantageous in a method according to the preceding paragraph if only the second optimization algorithm is applied above the variable switching frequency. This embodiment eliminates the need for parallel further conversion with the first optimization algorithm because the second optimization algorithm provides higher optimization quality above the switching frequency. This reduces computational effort since the frequency range with parallel and thus double computation can be minimized. Also advantageous in a method according to the preceding paragraph is when, starting from the low frequencies, only the first optimization algorithm is used up to a frequency limit below the variable switching frequency. This means that, starting from the low frequencies, only the first optimization algorithm is used exclusively at first, both optimization algorithms are operated in parallel from a frequency limit, and preferably only the second optimization algorithm is used further from the switching frequency. The double conversion and thus the double computing effort is also avoided for the low frequencies, allowing for a further reduction in computing power when performing a method according to the invention. This frequency limit is preferably set based on the quality characteristic of the individual optimization algorithms with a preferably sufficient distance from the expected variable switching frequency or from a predetermined switching frequency.

Further advantages can be achieved when, in a method according to the invention, based on multiple optimizations performed, a range of variable switching frequencies of previously performed conversions is stored as an expected switching frequency. If multiple optimizations of audio signals are performed, each of these optimizations results in a defined switching frequency at this embodiment. This plurality of defined and self-adjusting switching frequencies thus defines a range in which the variable switching frequency was located in the previously performed optimization tasks. This range can now be considered with high probability as a range in which the variable switching frequency can be expected for future optimization tasks. In particular, a lowest expected variable switching frequency and/or a highest expected variable switching frequency can be specified. The lowest expected switching frequency can, for example, be used as a frequency limit as explained in the preceding paragraph.

Another advantage is achieved when, in a method according to the invention, the first optimization algorithm is designed to be phase-dependent and the second optimization algorithm is designed to be phase-independent. The computational intensity of a phase-independent optimization algorithm is usually higher than that of a phase-dependent optimization algorithm. From a mathematical point of view, the second optimization algorithm, for example, uses a magnitude-based mathematical analysis of the respective frequencies in the optimization task.

Another advantage is achieved when at least one of the following specification parameters is used for the two optimization algorithms in a method according to the invention:

Recording profile specific to the geometric recording arrangement,

Listener group profile specific to a certain listener group,

Listener individual profile specific to a certain listener.

The preceding list is a non-exhaustive one. The recording profiles can be specific, for example, to the number or orientation of microphones. The recording profile is thus specific to the respective microphone array, which represents the geometric recording arrangement. This can be a real and/or virtual recording arrangement. Listener group profiles and/or listener individual profiles can be defined by the already explained HRTF (Head-Related Transfer Function). This allows multiple listeners to be grouped together, but also enables a procedure specific to an individual person to be performed using the inventive method. Of course, different specification parameters can also be combined to perform an inventive method.

It is also advantageous in the present invention to use at least partially a real recorded multidimensional audio signal as the original audio signal. As already explained, real recording arrays can be used in the form of a multitude of specifically arranged microphones. For example, they can record a concert in a concert hall as an artificial head and thus provide real generated audio signals as a basis for the present invention.

Additionally or alternatively, it can be advantageous if the multidimensional original audio signal is at least partially in the form of a digitally generated audio signal. Of course, digitally generated and real recorded audio signals can also be combined. Digitally generated audio signals can, for example, be generated by game engines or movie engines and represent multidimensional audio situations in films or in video games. They thus simulate artificial audio situations, which can be implemented by an inventive method in the same way.

It is also advantageous if in a method according to the invention, the two-dimensional listening audio signal is designed as a left-right audio signal. Such an audio signal refers to the user's ears and is particularly intended for playback on headphones. A correlation takes place in spatial terms with respect to the spatial left-right arrangement of the listener's ears during the conversion process. This left-right arrangement is taken into account, for example, in a corresponding profile, particularly in the form of an HRTF.

It is also advantageous if, in a method according to the invention, the method steps are carried out at least twice for different orientations of the two-dimensional listening audio signal. For example, this can simulate a movement or different orientation of the listener's head. One can start with a frontal orientation and then a left and a right rotated orientation. For example, rotation angles around a vertical axis of five degrees, ten degrees, or more are conceivable, so that for a large number of different rotation angles, a conversion filter specific to each rotation angle can be generated by means of a method according to the invention. Based on a determination of the rotation angle in the auditory situation, a suitable conversion filter can thus be selected for this measured angle to further improve the realism in the reproduction of the two-dimensional listening audio signal.

The present invention also relates to a computer program product comprising instructions that, when executed by a computer, cause the computer to perform the steps of the inventive method. Thus, an inventive computer program product provides the same advantages as have been described in detail with respect to the inventive method.

Another aspect of the present invention is a conversion method for converting a multidimensional original audio signal into a two-dimensional listening audio signal, comprising the following step:

Applying a conversion filter generated by a method of the present invention to the original audio signal for conversion into the listening audio signal.

Thus, an inventive conversion method also offers the same advantages as described in detail with respect to an inventive method.

Further advantages, features, and details of the invention will become apparent from the following description, in which embodiments of the invention are described in detail with reference to the drawings. The features mentioned in the claims and in the description may each be essential to the invention individually or in any combination.

DESCRIPTION OF SPECIFIC EMBODIMENTS OF THE INVENTION

Figure 1:
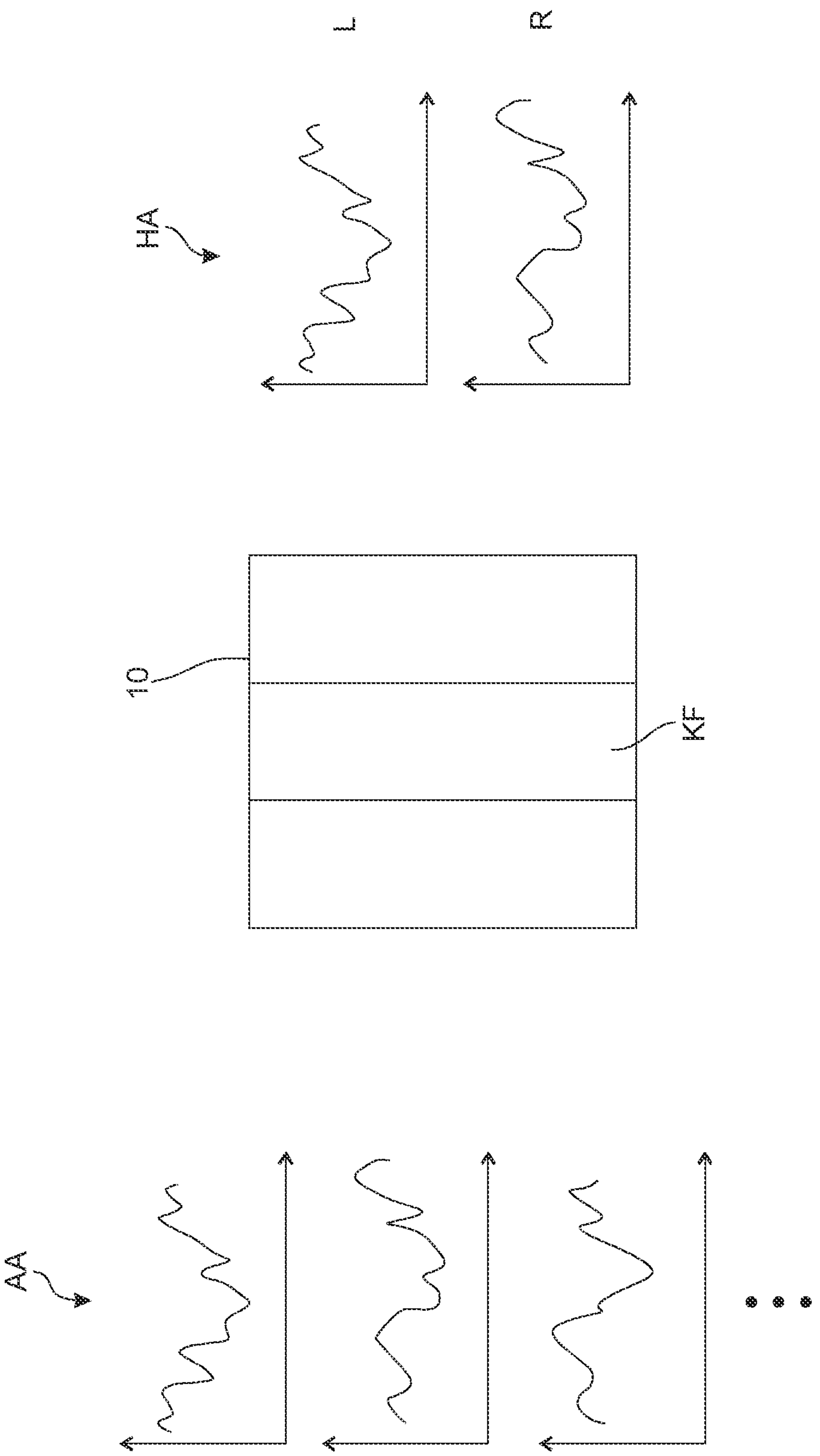
FIG. 1 shows an embodiment of the inventive conversion method.

In FIG. 1, it is shown schematically how multidimensional original audio signals AA can be converted into a plurality of individual data lines. For this purpose, a conversion device is provided, which is capable of performing a conversion into a two-dimensional listening audio signal HA in a computationally efficient manner using a conversion filter KF. This conversion is performed independently of the optimization algorithms KA 1 and KA2 explained above and leads to two audio signals for the left and the right ear. The application of these signals is based on a multidimensional recording, as shown, for example, in FIG. 2.

Figure 2:
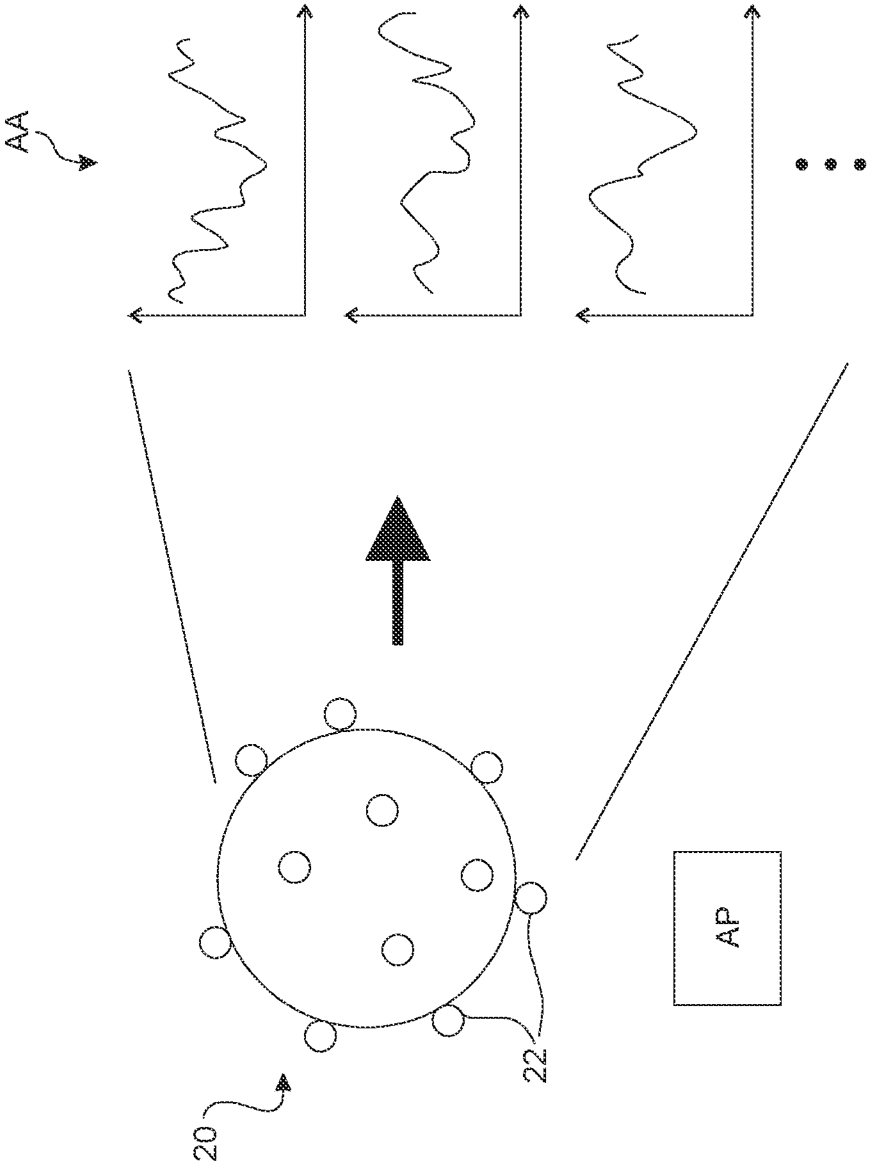
FIG. 2 shows an embodiment during the recording of original audio signals.

FIG. 2 shows a microphone array as a recording device 20 schematically. Here, a spherical dummy head is depicted as the recording device 20, on the surface of which a plurality of individual microphones 22 are arranged. Each of these individual microphones 22 records a sound track in a recording situation, with all sound tracks together, shown on the right in FIG. 2, forming the multidimensional original audio signal AA. The actual arrangement of the microphones 22 and the overall geometry of the recording device 20 represent the specification in the form of a recording profile AP.

Figure 3:
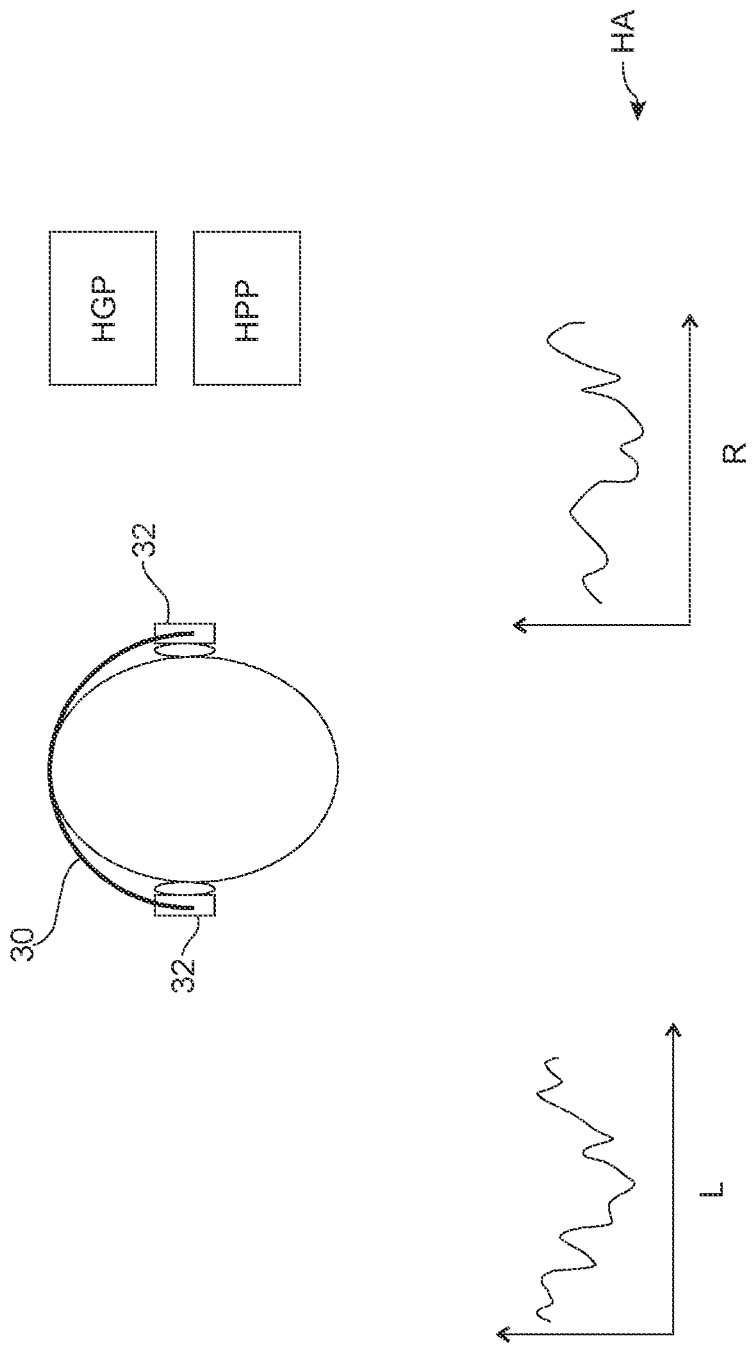
FIG. 3 shows a representation during the playback of listening audio signals.

FIG. 3 shows how the listening situation appears. A schematically depicted head of a listener is here equipped with headphones as playback device 30. This playback device 30 has a left headphone output and a right headphone output as audio output means 32. Either a listener group profile HGP or a listener individual profile HPP is specified here as a specification for the listening profile, specifically for a listener group or the exact listener. A left soundtrack and a right soundtrack are played back here, which together form the two-dimensional listening audio signal HA in this embodiment.

In order to carry out the conversion into the necessary two-dimensional listening audio signal HA using a conversion filter KF that is computationally efficient, an inventive method is performed beforehand.

Figure 4:
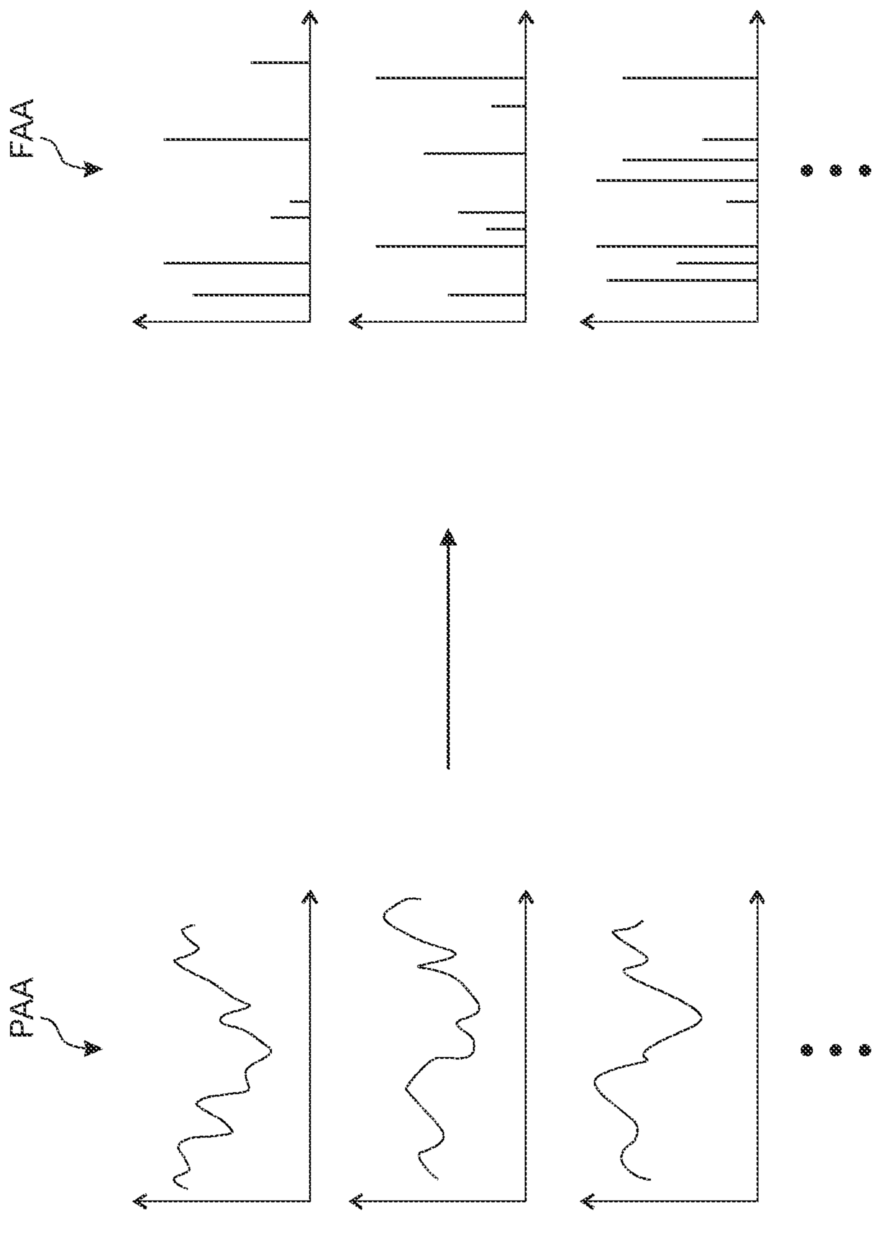
FIG. 4 shows a first step of an inventive method.

FIG. 4 shows how, in a first step, the time-based original audio signal PAA is converted into a frequency-based original audio signal FAA. This can be a real audio signal or a virtual audio signal. Multiple directions are provided for each channel, allowing for large channel numbers of 1000 or more. For example, a Fast Fourier Transform can be used. The number of audio tracks for each direction remains preferably the same and thus unchanged in this first transformation step.

Figure 5:
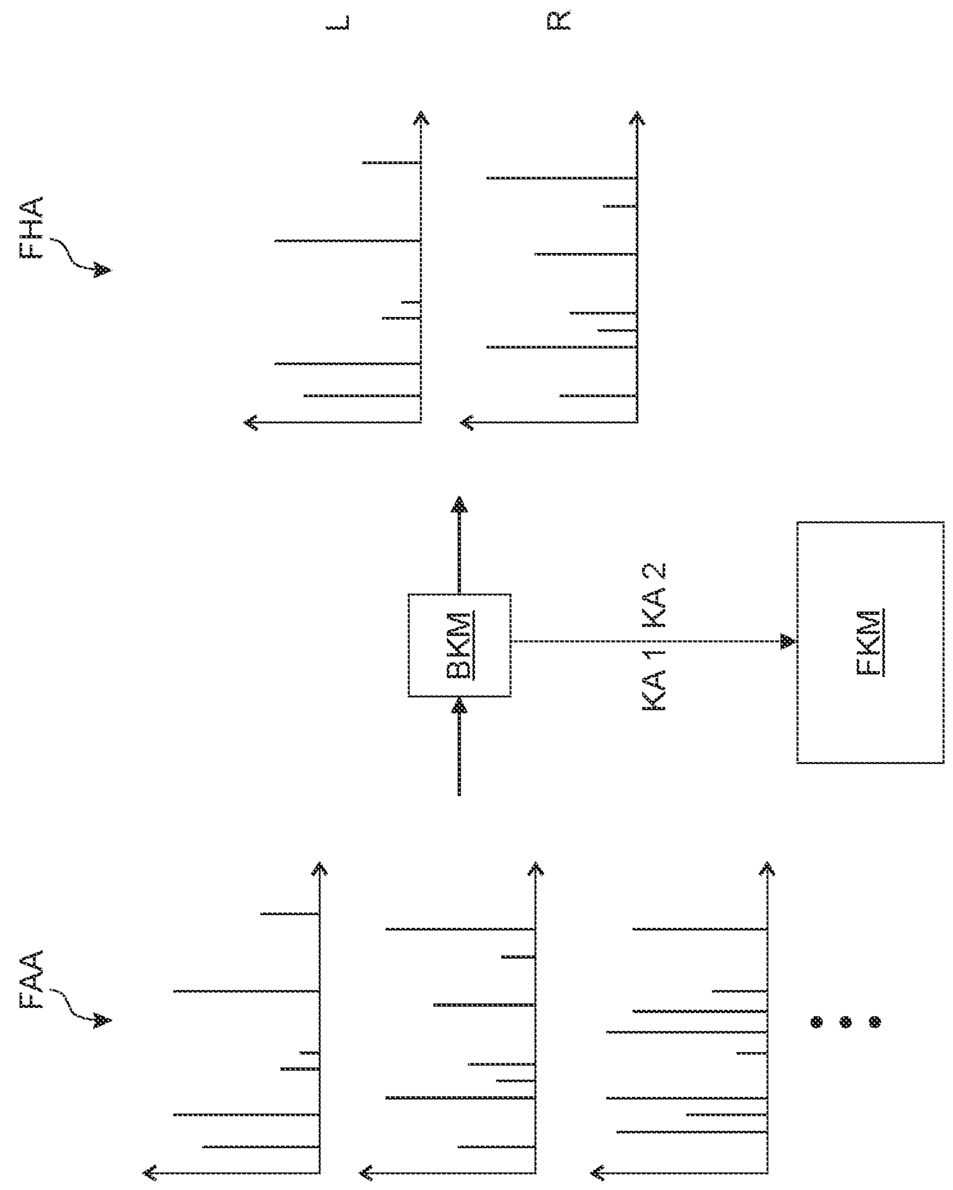
FIG. 5 shows a further step of an inventive method.

In the subsequent step of the inventive method, the actual conversion takes place. As shown in FIG. 5, at least two different optimization algorithms KA1 and KA2 are used. Using the basis conversion matrix, the conversion to the frequency-based listening audio signal FHA is carried out, which is schematically shown with two channels for one direction. For example, if 1000 directions are used for the method, this conversion will result in 2000 individual channels for the frequency-based listening audio signal FHA. The result of the optimization algorithms is stored in the frequency-based conversion matrix FKM in the form of the optimized basis conversion matrix BKM.

Figure 6:
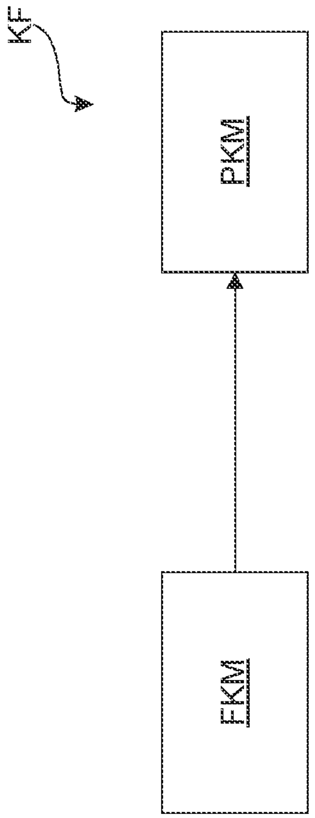
FIG. 6 shows another step of an inventive method.

FIG. 6 shows the final step, in which a time-based conversion matrix PKM is generated from the frequency-based conversion matrix FKM through inverse transformation, which can then be used as a conversion filter KF in the conversion task of a conversion process.

Figure 7:
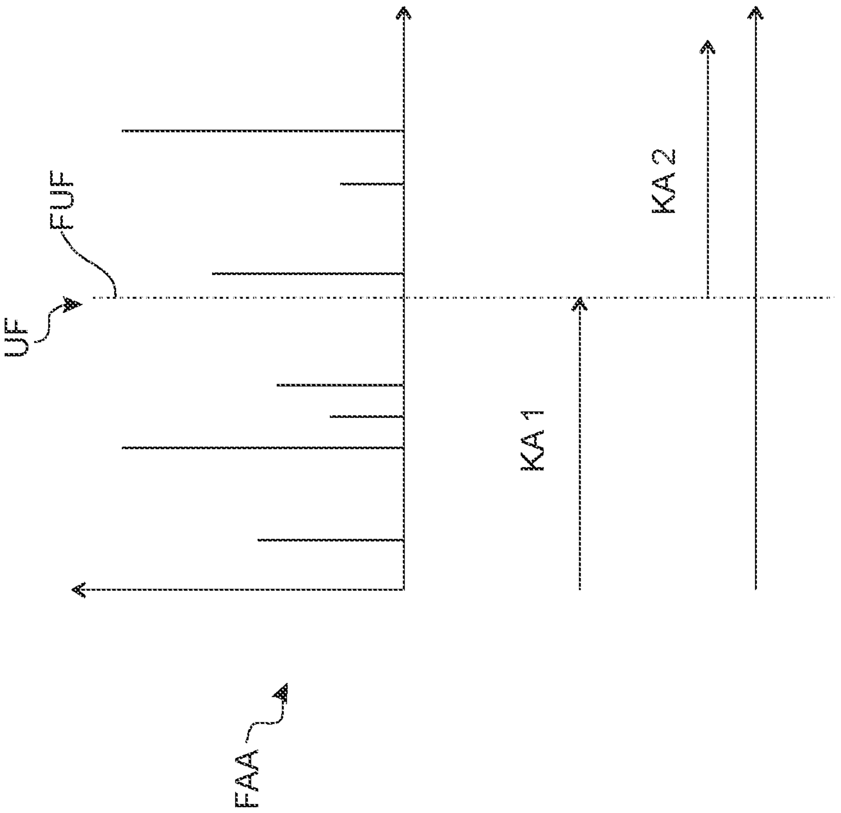
FIG. 7 shows a detailed representation of a step of an inventive method.

FIG. 7 shows a way in which the different optimization algorithms KA 1 and KA2 can be used. Here, a single audio track of the frequency-based original audio signal FAA is shown schematically. A sharp separation is given for a fixed switching frequency FUF as a switching frequency UF, so that starting from the lowest frequency, only the first optimization algorithm KA1 is used sequentially. When the switching frequency UF is reached, the process switches to the second optimization algorithm KA2, so that only the second optimization algorithm KA2 is used for the higher frequencies starting from the fixed switching frequency FUF.

Figure 8:
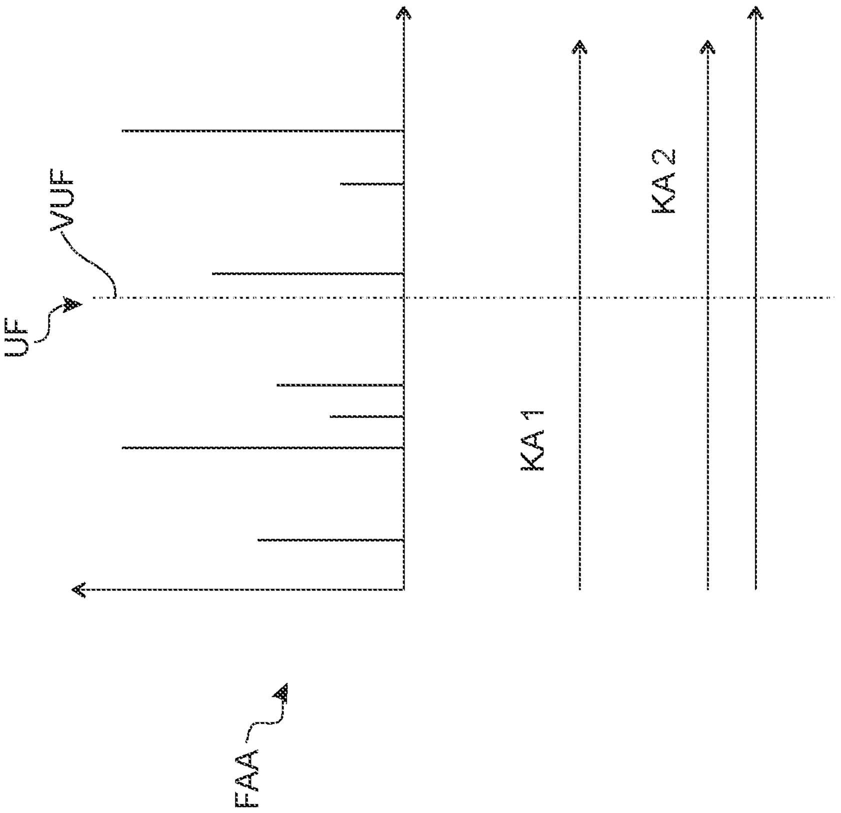
FIG. 8 shows a further detailed representation of a step of an inventive method.

FIG. 8 shows the described possibility of a completely parallel implementation of the optimization algorithms KA1 and KA2. However, only the qualitatively better optimization result is used for storage in the respective frequency-based conversion matrix FKM. In particular, a comparison of the optimization results at the same frequencies is performed based on the parallel implementation of the optimization.

Figure 9:
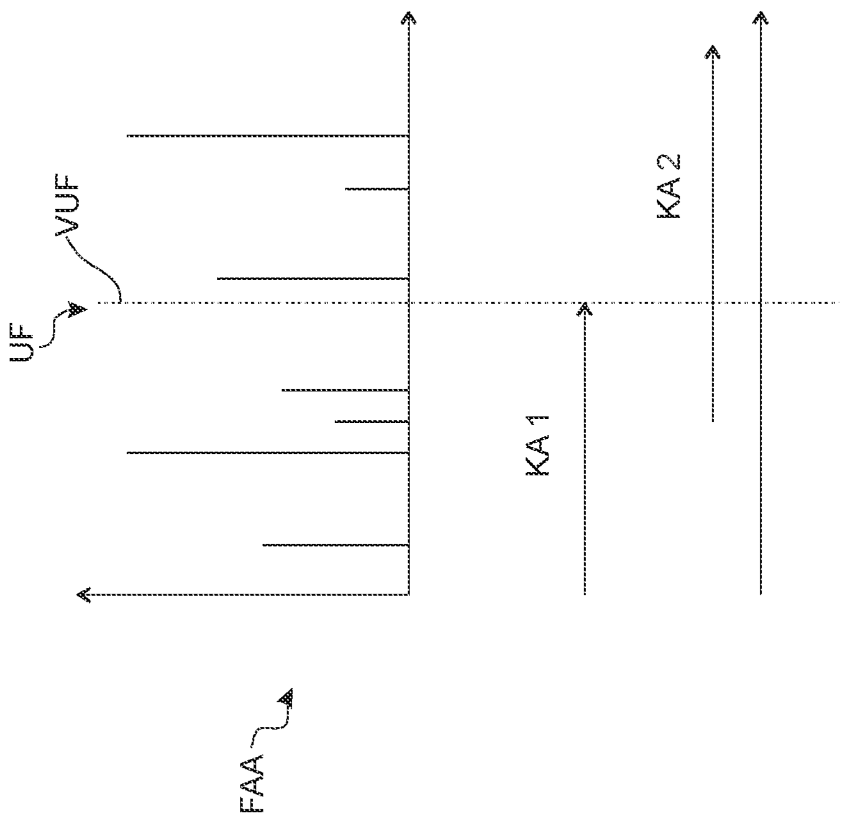
FIG. 9 shows a further detailed representation of a step of an inventive method.

FIG. 9 shows a way to reduce this double conversion, so that for example, only the first optimization algorithm KA1 is used at the beginning of the conversion. Over a certain period of time in the form of a frequency range, parallel acquisition takes place, for example, from a frequency threshold value, and the variable switching frequency VUF is set once the optimization error exceeds a predefined error threshold. From this variable switching frequency VUF, only the second optimization algorithm KA2 is used, so that compared to the embodiment of FIG. 8, the frequency range in which the parallel and thus double optimization must take place could be significantly reduced.

The above explanation describes the present invention solely within the scope of examples. Of course, individual features of the embodiments can be freely combined with each other, if technically feasible, without departing from the scope of the present invention.

REFERENCE SYMBOL LIST

10 Conversion Device
20 Recording Device
22 Microphone
30 Playback Device
32 Audio Output Device
AP Recording Profile
HGP Listener Group Profile
HPP Listener Individual Profile
KF Conversion Filter
BKM Base Conversion Matrix
FKM Frequency-based Conversion Matrix
PKM Time-based Conversion Matrix
KA 1 First Conversion Algorithm
KA2 Second Conversion Algorithm
AA Original Audio Signal
PAA Time-based Original Audio Signal
FAA Frequency-based Original Audio Signal
HA Listening Audio Signal
FHA Frequency-based Listening Audio Signal
UF Switching Frequency
FUF Fixed Switching Frequency
VUF Variable Switching Frequency

The invention claimed is:

1. A method for generating a conversion filter (KF) for converting a multidimensional original audio signal (AA) into a two-dimensional listening audio signal (HA), comprising the following steps:

transforming a time-based original audio signal (PAA) into a frequency-based original audio signal (FAA);

sequentially optimizing a basis conversion matrix (BKM) for converting the frequency-based original audio signal (FAA) into a frequency-based listening audio signal (FHA) using a first optimization algorithm (KA1), starting from low frequencies and ascending to at least a switch frequency (UF);

sequentially optimizing the basis conversion matrix (BKM) for converting the frequency-based original audio signal (FAA) into a frequency-based listening audio signal (FHA) using a second optimization algorithm (KA2), starting from the switch frequency (UF) and ascending to high frequencies;

storing the optimized basis conversion matrix (BKM) of the correlation between the frequency-based original audio signal (FAA) and the frequency-based listening audio signal (FHA) in a frequency-based conversion matrix (FKM); and transforming the frequency-based conversion matrix (FKM) into a time-based conversion matrix (PKM) as the conversion filter (KF).

2. The method of claim 1, wherein a predefined fixed switch frequency (FUF) is specified as the switch frequency (UF).

3. The method according to claim 1, wherein at least sectionally the first optimization algorithm (KA1) and the second optimization algorithm (KA2) are carried out in parallel, with the difference between the two optimization results, being determined as the optimization error of the first optimization algorithm (KA1).

4. The method of claim 3, wherein, for storage in the frequency-based conversion matrix (FKM), the result of the first optimization algorithm (KA1) with a variable switch frequency (VUF) is stored until a predefined error limit is reached, and from this variable switch frequency (VUF) onwards, the result of the second optimization algorithm (KA2) is stored.

5. The method of claim 4, wherein only the second optimization algorithm (KA2) is applied above the variable switch frequency (VUF).

6. The method according to claim 4, wherein only the first optimization algorithm (KA1) is used starting from low frequencies up to a frequency limit below the variable switch frequency (VUF).

7. The method according to claim 3, wherein a range of variable switch frequencies (VUF) of these optimization procedures is stored as an expected switch frequency (UF) based on multiple optimization procedures.

8. The method according to claim 3, wherein the first optimization algorithm (KA1) and the second optimization algorithm (KA2) are carried out in parallel, completely from low frequencies to the switch frequency (UF).

9. The method according to claim 1, wherein the first optimization algorithm (KA1) is phase-dependent and the second optimization algorithm (KA2) is phase-independent.

10. The method according to claim 1, wherein at least one of the following specification parameters is used for the two optimization algorithms (KA1, KA2):

a recording profile (AP) specific to a geometric recording arrangement;

listener group profile (HGP) specific to a certain listener group;

listener individual profile (HPP) specific to a specific listener.

11. The method according to claim 1, wherein at least partially a real recorded multidimensional audio signal is used as the original audio signal (AA).

12. The method according to claim 1, wherein a digitally generated audio signal is used at least partially as the multidimensional original audio signal (AA).

13. The method according to claim 1, wherein the two-dimensional listening audio signal (HA) is designed as a left-right audio signal.

14. The method according to claim 1, wherein the method steps are carried out at least twice for different orientations of the two-dimensional listening audio signal (HA).

15. A conversion method for converting a multidimensional original audio signal (AA) into a two-dimensional listening audio signal (HA), comprising:

applying a conversion filter (KF) generated by a method having the features of claim 1 to the original audio signal (AA) for conversion into the listening audio signal (HA).

* * * * *